United States Patent
Blyth et al.

[11] Patent Number: 6,000,362
[45] Date of Patent: Dec. 14, 1999

[54] FEEDING SYSTEM FOR CULTURED SPECIES

[75] Inventors: Peter John Blyth, Blackmans Bay; John Fabian Russell, Claremont, both of Australia

[73] Assignee: Aquasmart Pty Ltd, Clenorchy, Australia

[21] Appl. No.: 09/068,897

[22] PCT Filed: Nov. 25, 1996

[86] PCT No.: PCT/AU96/00752

§ 371 Date: May 21, 1998

§ 102(e) Date: May 21, 1998

[87] PCT Pub. No.: WO97/19587

PCT Pub. Date: Jun. 5, 1997

[30] Foreign Application Priority Data

Nov. 24, 1995 [AU] Australia ............................ PN6814

[51] Int. Cl.⁶ .................................................. A01K 61/02
[52] U.S. Cl. ............................................................. 119/51.04
[58] Field of Search ........................... 119/51.04, 51.01, 119/51.11, 51.12

[56] References Cited

U.S. PATENT DOCUMENTS

| | | | |
|---|---|---|---|
| 3,171,385 | 3/1965 | Decker et al. | |
| 3,720,185 | 3/1973 | Aldous et al. | |
| 3,918,405 | 11/1975 | Hostetler | 119/57.3 |
| 4,029,052 | 6/1977 | Launder | 119/57.2 |
| 4,359,014 | 11/1982 | Molaug et al. | 119/51 R |
| 5,105,767 | 4/1992 | Gordon et al. | 119/57.92 |
| 5,138,979 | 8/1992 | Baird et al. | 119/51.04 |
| 5,291,858 | 3/1994 | Patrick et al. | 119/230 |
| 5,424,957 | 6/1995 | Kerkhoff et al. | 364/479.1 |
| 5,600,138 | 2/1997 | Colson et al. | 250/330 |

FOREIGN PATENT DOCUMENTS

| | | |
|---|---|---|
| 1201392 | 1/1992 | Australia . |
| 3939195 | 11/1995 | Australia . |
| 2441936 | 3/1976 | Germany . |
| 1112935 | 5/1989 | Japan . |
| 1112936 | 5/1989 | Japan . |
| 4304830 | 10/1992 | Japan . |
| 05276849 | 10/1993 | Japan . |
| 2100961 | 1/1983 | United Kingdom . |
| 2207331 | 2/1989 | United Kingdom . |
| 9212628 | 8/1992 | WIPO . |
| 9615663 | 5/1996 | WIPO . |

OTHER PUBLICATIONS

Patent Abstracts of Japan of JP 1–112936 Dated May 1, 1989, C–623, p. 36.
Patent Abstracts of Japan of JP 1–112935 Dated May 1, 1989, C–623, p. 35.
Patent Abstracts of Japan of JP 4–304830 Dated Oct. 28, 1992, C–1035, p. 124.

Primary Examiner—Peter M. Poon
Assistant Examiner—Yvonne R. Abbott
Attorney, Agent, or Firm—Ladas & Parry

[57] ABSTRACT

A feeding system for cultured species including: (a) providing (i) a sensor able to detect feed particles passing through a sample area, and (ii) a control unit, including computer data storage media in communication with the sensor; and (b) detecting and discriminating feed particles that pass through the sample area; wherein the control unit is able to process information obtained from the sensor and regulate subsequent feed output based on algorithm parameters, said algorithm parameters determine the instantaneous feed rate of the cultured species to adjust and match the preferred feed values meted to the cultured species at any given time.

11 Claims, 5 Drawing Sheets

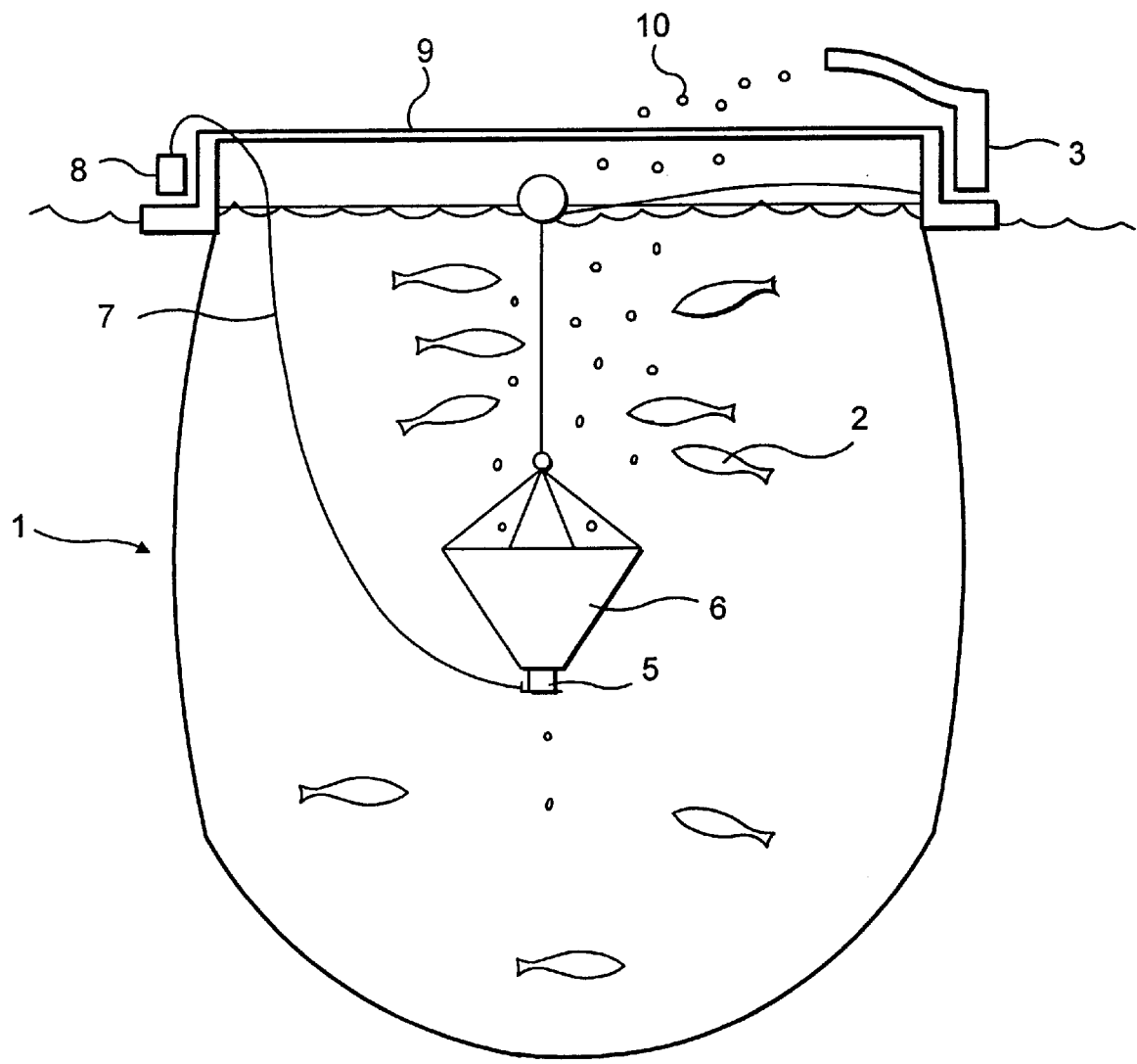
F I G. 1

FEEDING SYSTEM FOR CULTURED SPECIES

This invention relates to a system for feeding cultured species, and in particular in relation to cultured fish species. The system is able to automatically regulate feed output for the cultured species.

Wild species of fish introduced to aquacultures, and indeed semi wild domesticated species, exhibit broad feeding cycles that reflect the very nature of the diversification of such species. Such feeding cycles are effected by exogenous and endogenous factors that impose variations to the broad pattern. Because of these variations, it is difficult to match feed output to the preferential feeding patterns of the cultured fish and thereby effect the ability to maximise the growth of the cultured fish. Such variations also effect the feeding efficiency resulting in feed wastage Various systems are available that, to a certain extent regulate the feed provided to aquaculture systems Such systems may include detection devices which are able to shut off the supply of feed if an amount of feed is detected above a minimum value. Such systems generally are merely a "on/off" system and do not take into account the various exogenous and endogenous factors that may effect the feeding pattern. Accordingly, feed wastage still occurs, and indeed the fish may also not be fed to satiation.

It should however be appreciated that the system may have broader applications for use other than in the feeding of fish species, for example the feeding of cultured crustaceans or indeed non-aquatic species For convenience, it is appropriate to describe the invention in reference to aquaculture species in particular.

It is an object of the present invention to overcome or at least alleviate one or more of the difficulties associated with such systems.

The present invention resides in a feeding system for cultured species including:
(a) providing
    i) a sensor able to detect feed particles passing through a sample area, and
    ii) a control unit, including computer data storage media in communication with the sensor; and
(b) detecting and discriminating feed particles that pass through the sample area;
wherein the control unit is able to process information obtained from the sensor and determine subsequent feed output based on algorithm parameters, said algorithm parameters regulate the instantaneous feed rate of the cultured species to adjust and match the preferred feed values meted to the cultured species at any given time.

The invention is able to identify and adapt the macro and micro changes in feeding behaviour in order to increase the feeding efficiency of the cultured species. The system according to the invention is able to ensure that fish are fed to satiation (or below if required) while maintaining an efficient food conversion ratio.

The sensor of the present invention is able to detect a sample, or indeed the absolute amount of feed which passes through a population of species occupying a particular aquaculture system. The system may include an enclosure such as a net, pen, tank, pond or other enclosure suitable for aquaculture. The information obtained by the sensor may be used by the control unit to regulate subsequent feed output.

Generally, the control unit of the invention incorporates computer data storage media, interface circuitry, EPROM memory, RAM memory, battery backed real-time clock, control button, LCD display together with appropriate software. The system may also include a switched source of power for activating existing feed dispensers.

Accordingly, the present invention further resides in computer data storage media embodying computer software which functions according to the following steps:
i) process information received from a sensor able to detect feed particles in a sample area;
ii) discriminate feed particles from other particles passing within the sample area;
iii) determine the instantaneous feed rate of a cultured species within a defined system; and
iv) determine subsequent feed output based on algorithm parameters to match the preferred feed values meted to the cultured species at any given time.

The control unit is able to store the feeding history of the cultured species and to calculate an optimum feed regime based upon the stored history, and/or other parameters inputed by a user. The feed history may be mapped over a period of time by monitoring the feeding behaviour of the cultured species relative to the feed output and the amount of feed detected by the sensor.

The feed output is preferably controlled by the control unit. The control unit preferably has a learning ability to allow it to call on prior knowledge or memory to calculate appropriate instantaneous settings. This learning ability is preferably encoded by software. The prior knowledge, or stored history, is based on past events, including feeding meal rates and feeding periods, and is stored and averaged over a period of time.

The sensor may be any suitable sensing device capable of sensing the amount of feed passing through a sample area. The sensor may be any sensor able to measure the change in flux of particles passing through a sample area, including measurement by optical, ultrasonic or other doppler effect. The sample area may be a small sample area within the aquaculture system, or indeed may be the entire aquaculture system. The sensor should be able to discriminate between feed particles and other foreign material.

A preferred sensor includes:
(i) a body having an aperture orientated in use to allow objects to pass therethrough;
(ii) at least one light emitter for projecting a band of light across the aperture; and
(iii) at least one light receiver for detecting the amount of light passed across the aperture;
wherein, in use, the profile of an object passing through the aperture is determined ratiometrically by measuring the instantaneous change in light level caused by the occlusion of light by the object.

Such a sensor may include collimating mirrors in order to direct the light from the light emitter to the light receiver. Real-time analysis of the profile of the object passing through the aperture allows for discrimination between the feed pellets and other objects passing through the aperture and is able to determine the rate of which the feed particles pass through the aperture.

A preferred sensor is described in co-pending Australian application PN 6815 and subsequently as International application No. PCT/AV96/00751, the entire disclosure of which is incorporated herein by reference.

The sensor is generally used for underwater use. Accordingly, it is preferred to have a sensor where the light receiver(s), light emitter(s), collimating mirrors and other associated circuitry is based with a body. The body generally involves a material transparent to the wavelength of light used by the sensor. The general design allows different sensors with a range of apertures to be manufactured utilising common operating principles and manufacturing techniques. The body generally incorporates a planar configuration consisting of two opposing plates allowing the components of the sensor to be enclosed therein. The body may be fabricated from flat sheets, such as acrylic, polycarbonate or similar material either by machining or molding. The plates have recessed areas which enclose the collimating mirrors, the light emitters and receivers and accompanying electronic systems. The opposing sheets are bonded at the time of assembly to provide a completely water tight enclosure. The bonding technique may utilise adhesives, ultrasonic welding or any suitable method, including the use of fastening bolts.

The underwater sensor may be submerged to a depth which is dependent on the type of cage structure, average water conditions, the species feeding behaviour, the number of species in the cage, the age of the species and the type of feed used. For example, fish feeding depth will also alter under certain environmental and temporal conditions.

The control unit will generally control the feed dispensed to the cultured species. The control unit is able to utilise information received from the sensor, and other parameters including "learnt" feeding history of the species and other inputed parameters.

Preferably, in a typical feeding pattern, the minimum feed value is dispensed for a short period of time of from, for example, half a second to 60 seconds. The sensor is then able to determine the amount of feed particles passing through the sample area. Information is then relayed to the control unit relating to the number of feed particles in the sample area relative to a predetermined value. The computer data storage media of the control unit is able to adjust subsequent output according to the information it receives. A typical feed cycle may include the steps of;

(i) increasing the feed output if the number of feed particles in the sample area are below a predetermined value;

(ii) maintaining the feed output if the number of feed particles in the sample area are within a pre-determined threshold;

(iii) decreasing the feed output if the number of feed particles are above a pre-determined value or discontinue feeding if the number of feed values are above a predetermined minimum value.

Preferably, the feed will be dispensed at intervals from about 1 second to about 10 minutes. Most preferably, feed is disposed every 1 to 2 minutes, although this may vary depending upon both the maximum and minimum predetermined instantaneous feed rate, and the feed distributor hardware.

In establishing the system according to the present invention, the system may further include the steps of:

(a) Establishing the relevant information relating to the setting of algorithm parameters prior to dispensing the minimum feed value. Such algorithm parameters may relate to factors such as minimum and maximum feed values, feed increments, species type and number, and other environmental considerations, such as water temperature.

(b) Calibrating the sensor to determine spatial configuration relating to the sample area. For example, some calibration will be required depending upon the depth at which the sensor is likely to be placed, water turbulency, currents and other such factors. Calibration may also be required in order to allow the sensor to discriminate between the feed particles and other matter, for example fish faeces.

(c) Comparing and adjusting the calibration of the sensor to compensate for uncalibrated objects. Such additional calibration may be conducted during the feeding cycle to allow for matters and other objects that were not previously considered. This may be an ongoing requirement, but generally, due to the ability of the software to learn, further calibration is not required.

The sensor and control unit are able to utilise electronic and statistical methods to define food particles such as pellets as opposed to other foreign material.

The system itself may be monitored remotely by a hard wired communication link to the control unit, or by radio communications or by means of a portable data log off. The system can operate independently of a communication link if required.

The system may incorporate multiple sensors through a single controller and a single sensor or variations thereof.

Various algorithms are used in order to determine the instantaneous feed output. This may be achieved by an adaptive feeding algorithm which utilises the underwater sensor to discriminate pellets and then "decide" on an appropriate feeding level. The system uses predetermined program setting values as a starting point and over time software function evaluates and optimises these settings based on the full pattern data accumulated.

The following description provides examples of the parameters that are used to establish ranges within which the algorithm can function.

System parameters (sensor calibration and program settings) are initially set by the user or from pre-defined internal tables of settings. After a period of time (for example 1 week, enough data is collected by the system for the system to automatically evaluate the best or most appropriate feeding rate and frequency and/or sensor calibration values, and to test whether the user defined settings are appropriate. Changes are made and the user is informed if there is a significant shift.

The system temporally "maps" and stores the average cumulative feeding patterns (feed output per time). The number of food particles counted over time and user generated system setting values. All these parameters can change as fish get larger, feed size changes or environmental and seasonal factors such as temperature, photo period etc alter. The system automatically compares user settings to historical data and then optimises settings to accord with the current situation.

The system accomplishes this by comparing historical averages relevant to the species, average for size, stock density, culture unit type, seasonal variations such as water temperature and latitude. Various parameters may then be varied automatically, for example such parameters include:

The maximum feed delivery (food amount/bio-mass of culture species/time)

The minimum feed delivery (food amount/bio-mass of culture species/time)

The duration of the meal

The number of meals per day

The distribution of daily feed intake per meal

The period between meals (sleep period)

The quantity and frequency of delivery of feed within a meal

The ratio of the quantity of feed particles counted in relation to the amount of food presented.

The feed particles generated through user inputed parameters is calibrated and data is compared to the actual present calibrated values recorded. When calibrated pellet values (user calibrated) appear different to actual pellets sensed, the system will self adjust and inform the user. The system will then utilise these modified calibration values. The user can then re-calibrate the sensor and then verify that the newly calibrated values are not significantly different to the systems modified calibration values if required. This self analysis allows for the detection of potential changes in the pellet characteristics such as pellet density or shape, factors that the user may not distinguish easily. The user will generally only distinguish changes in pellet size (for example a change from a 4 mm diameter pellet to a 6 mm diameter pellet and will in this case re-calibrate the sensor manually.

Various program parameters may be incorporated into the system and adjusted by algorithm if deviations occur. The algorithm stores the required information. Definitions of user entered and defined settings may include:

Sink Rate:

The sink rate (cm/second) of the pellet used in combination with the sensor depth is used to establish or give the algorithm a guide as to when pellets will pass through a sample area. This allows the algorithm to sequence feed delivered to match the time when this feed should pass the sample area.

Depth:

This is the depth from the water surface to the sensor

Gain:

This is an adjustment which allows the user to eliminate "background" interference if present and depends upon the type of sensor used with the system. The algorithm can automatically range the gain setting to determine the most appropriate value at the time.

The control unit bases all operations on daily feeding programs with settings defined by the user and modified based on historical data collected by the system. Each program divides the day into intervals or steps. These intervals are specified by means of a start time and a stop time.

Sleep:

The sleep period is the period that the system does not operate in between feeding periods or meals.

Minimum Pause:

The minimum pause time is the shortest time between feed output events during a meal and is determined initially by a system of pre-determined values based on the species and stocking density and culture type factors.

Maximum Pause:

The maximum pause is the maximum delay between feeder output events and is determined by the same factors as the minimum pause.

Minimum Sleep:

The minimum sleep time is the smallest time that the feeder will remain inactive after a feeding bout or meal has completed.

Maximum Sleep:

The maximum sleep time is the longest period that all operations are suspended after a feeding bout. Over the day, the sleep period will auto range between the minimum and the maximum sleep settings to hone in on the preferred temporal feeding pattern of the fish.

Minimum Feed:

This is the minimum amount of feed delivered

Maximum Feed:

This is the maximum amount of feed delivered by the feed distributor.

The upper limit can be constrained by the size of the cage, feed in spatial distribution pattern and maximum number of pellets ingested per fish per minute. The appropriate instantaneous intake rate is determined by auto ranging between the minimum and maximum feed values.

Sensitivity:

Sensitivity is the level of feed detected that determines the subsequent feed output outcome.

Meal Maximum:

The meal maximum sets the upper limit to the amount of food delivered in a meal, that is without a sleep period intervening before the system will warn the user or turn off automatically. This is a safeguard against over feeding due to malfunction of hardware.

Water current threshold:

When the water current reaches a threshold velocity and direction of the system will be turned off until the current and direction go below the threshold. This will allow for the sensor to account for feed which may be lost due to water movement.

The computer data storage media is able to adapt certain parameters as may be required. Such parameters may include:

The instantaneous feed output, which is the actual amount of feed delivered after the algorithm has analysed all circumstances.

The instantaneous feeding process that utilises user defined settings and historical data to regulate the instantaneous feed output. This is determined by an instantaneous feeding algorithm.

The pattern recognition response determined by an algorithm analyses historic system settings, feeding pattern data and other factors to modify the instantaneous feeding process, and therefore the instantaneous feed input.

Object discrimination response to allow for and discriminate from uncalibrated objects using statistical methods.

The window, or period during which the sensor is functioning, when the probability of detecting calibrated objects is greatest:

The system of the invention may include the following process steps:

(A) determine historical system settings;

(B) modify current system parameters if necessary;

(C) set the feed distributor output to a minimum feed value;

(D) Record "background" events, that is uncalibrated objects outside of the sensing window and define the number of model groupings using statistical techniques;

(E) dispense the selected amount of feed;

(F) commence sensing just prior to the sensing window. Compare uncalibrated objects in the pre-sensing window to calibrated objects;

(G) compare pre window uncalibrated objects to window sensed objects and compensate if necessary;

(H) adjust if necessary;

(I) measure any feed pellets which pass through the sensor;

(J) wait for a short period, for example, 1–60 seconds;

(K) if less than a predetermined threshold number of pellets were counted and the feeder output is less than a predetermined maximum value, increase output of feeder by one increment;

if greater than the threshold number of pellets are counted, reduce output of feeder by an increment of its previous value, if the number of pellets counted equals threshold or is within a band, maintain feeder output;

(L) if the feeder output determined is less than a predetermined minimum then wait for a predetermined sleep time, for example 30 minutes to 1 hour, and compare feed rate per time of day to historical information to optimise sleep value. If pattern recognition response criteria has been met, then sleep for a predetermined period, then return to step (A).

All this information, both user inputed, and those adapted by the system through use, allow for a feeding system that automatically adjusts to the desired feeding regime of the cultured species. The feed outcome is based upon prior inputed values, prior feeding pattern profiles and prior and present algorithm settings.

The system of the invention provides for an improvement in the feed conversion efficiency in feeding cultured fish species in particular. Determining tests in salmonids have shown a 5–20% improvement in feed conversion efficiency with a $10 \geqq 20\%$ faster growth rate of the fish, and a more uniform fish size. There is also a more consistent flesh characteristic (pigment, fat content and texture), a reduction in feed wastage, and a shortening of production cycle by up to 1 to 5 months. There is also a general improvement in stock health due to satiation feeding in each meal.

The system may also allow for some control of production/harvest by adopting a particular strategy, for example satiation feeding, restricted feeding or cyclical feeding.

It will be convenient to describe the invention by reference to the accompanying drawings which illustrate some preferred embodiments of the invention. Other embodiments of the invention are possible and consequently the particularity of the accompanying drawings is not to be understood as surpassing the generality of the preceding description of the invention.

FIGS. 1 and 2 depict a schematic diagram of the embodiments of the cultured species feed system according to the invention.

FIGS. 3 and 4 relate to graphical representation of a typical feeding pattern for a fish species.

Figure 2:
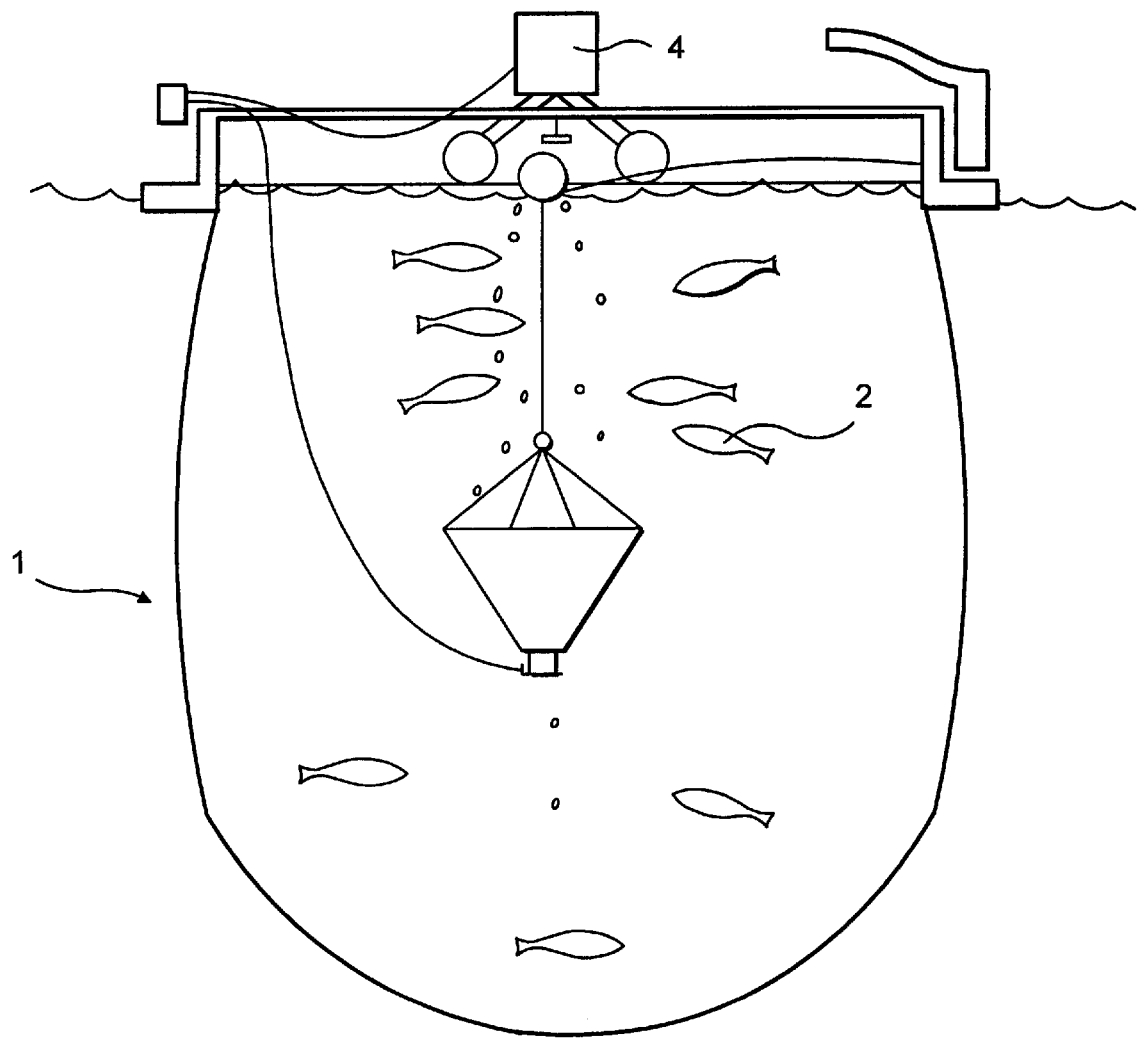

FIG. 1 schematically illustrates an aquaculture system (1) including fish (2). The fish are fed either by a centralised feed system such as a canon feed system (3) (shown in FIG. 1) or a hopper system (4) (shown in FIG. 2).

A sensor (5) is positioned at a depth below the normal feeding depth of the fish. A funnel (6) collects a sample of the feed passing through the aquaculture system. The sensor is able to obtain information relating to the amount of feed and through cable (7) is able to relay information to a control unit (8) including computer data storage media. The control unit is able to regulate the feed metered from the centralised feeding system, such as the common feeder of FIG. 1, or the hopper feeder of FIG. 2, through a connection (9). Connection (9) may be handwired, radio controlled or other means, depends upon the particular arrangements.

Feed (10) is distributed by the centralised feeder, and a portion of it will pass through funnel (6). Information relating to that feed, is determined by the sensor and relayed to the control unit.

Figure 3:
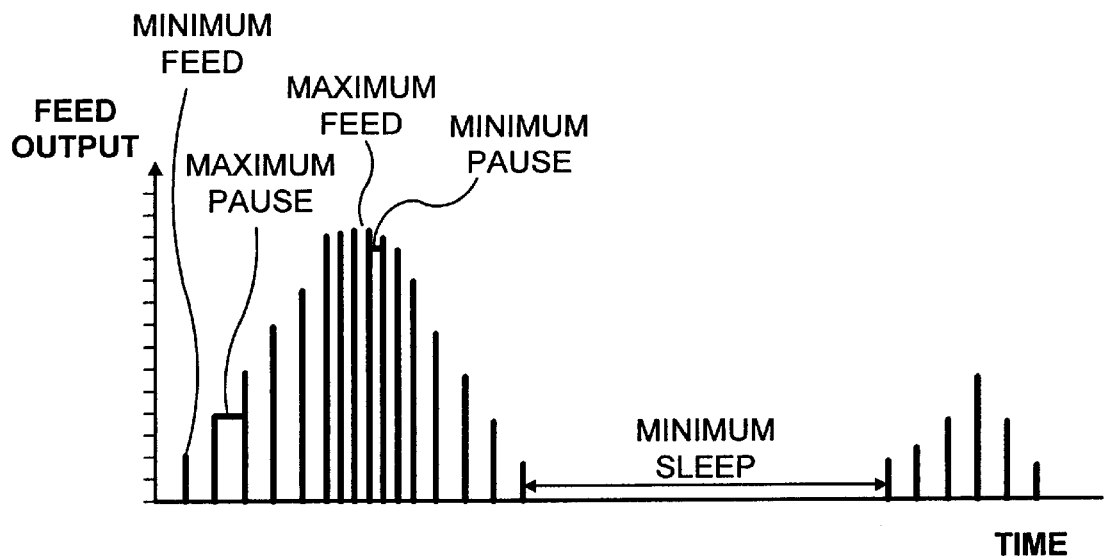

FIG. 3 illustrates a graphical representation of a feeding pattern. A minimum feed may be dispensed to the fish and if the amount of feed detected by the sensor is below a predetermined value, an increased amount of feed is then dispensed. This is shown graphically with the feed output increasing over time. This will continue until a predetermined maximum feed output is reached and a minimum pause interval between feeds is reached. Once the amount of feed detected by the sensor is above a pre-determined value, the feed output will decrease until satiation of the fish is detected. At that time the system will withhold feeding until a feeding pattern is detected.

The system will then sleep for a period until a feeding cycle is detected again The sleep period may be predetermined, or calibrated depending upon previous feeding cycles learnt by the control unit.

Figure 4:
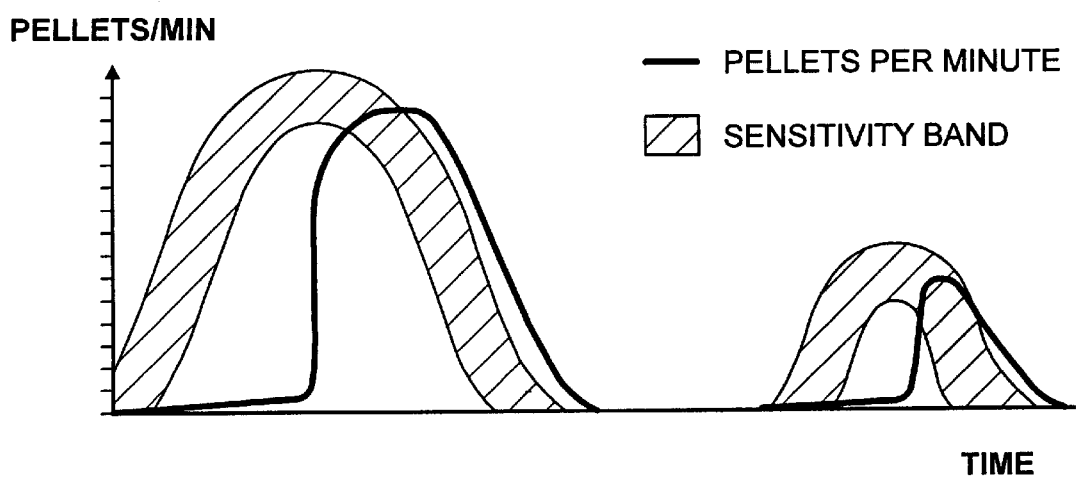

A correlation between the sensitivity of the system, and the pellets per minute is shown in FIG. 4.

Figure 5:
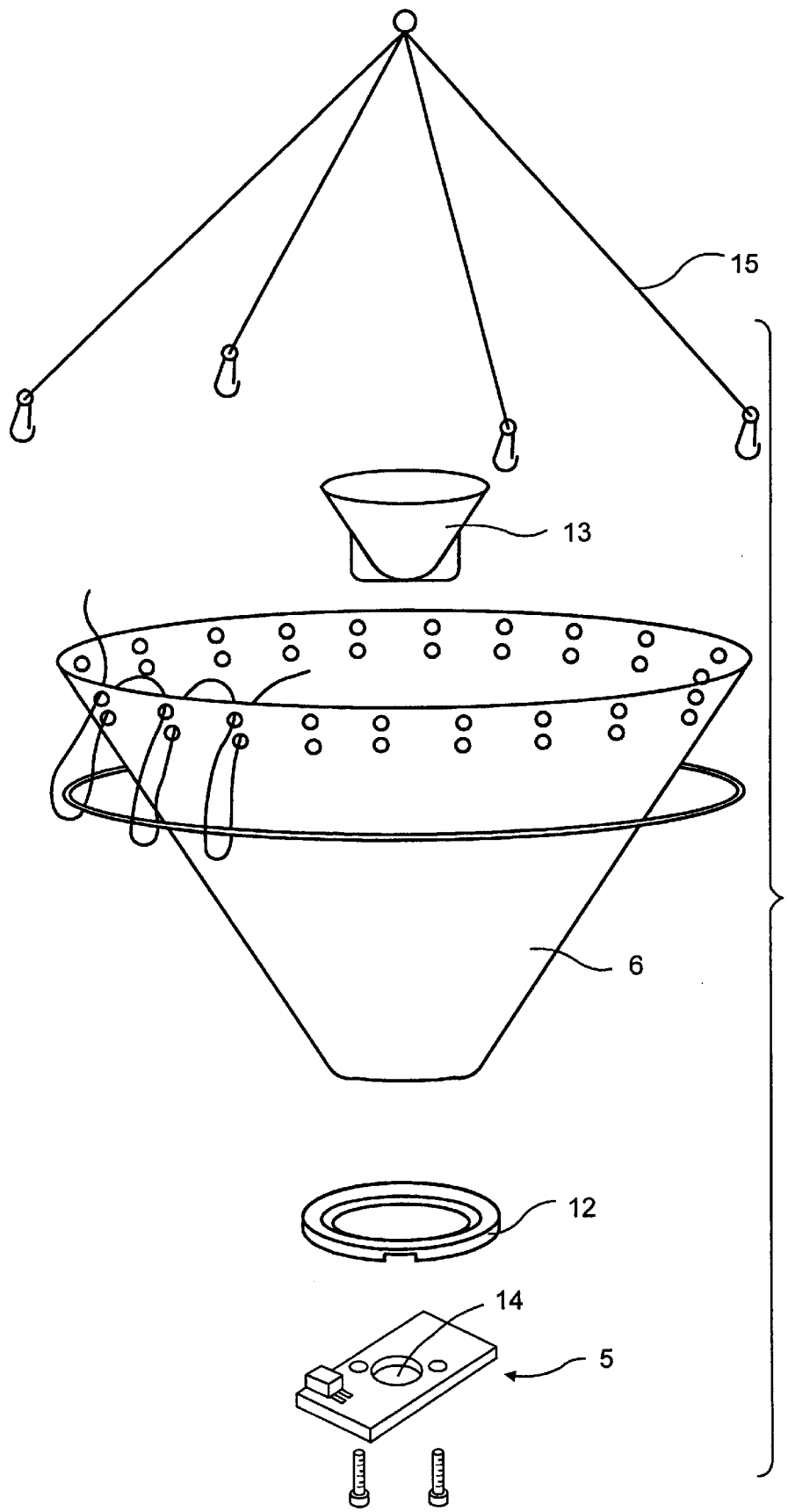
FIG. 5 represents an embodiment of a sensor arrangement shown in FIGS. 1 and 2.

FIG. 5 shows an enlarged embodiment of a sensor arrangement, as shown in FIGS. 1 and 2. It shows a sensor (5) incorporated into a funnel (6) by use of bolts (11) and attached to ring (12). A cone (13) may be placed within the funnel to assist in ensuring that a sample of the object passes through the aperture (14) of the sensor. The funnel may be suspended by ropes (15)

The underwater funnel (6) and sensor (5) is connected electronically, or by fibre optic cable, to the control unit. The sensor itself may be external of the aquaculture system but should be such that it is able to detect the amount of feed passing through the system. The sensor should be positioned in such a way to establish the end of the feeding period without wasting food. This may be achieved by a combination of adjustments to several algorithm parameters (sensitivity and time of delay and spatial and/or temporal arrangements of the sensor).

Figure 6:
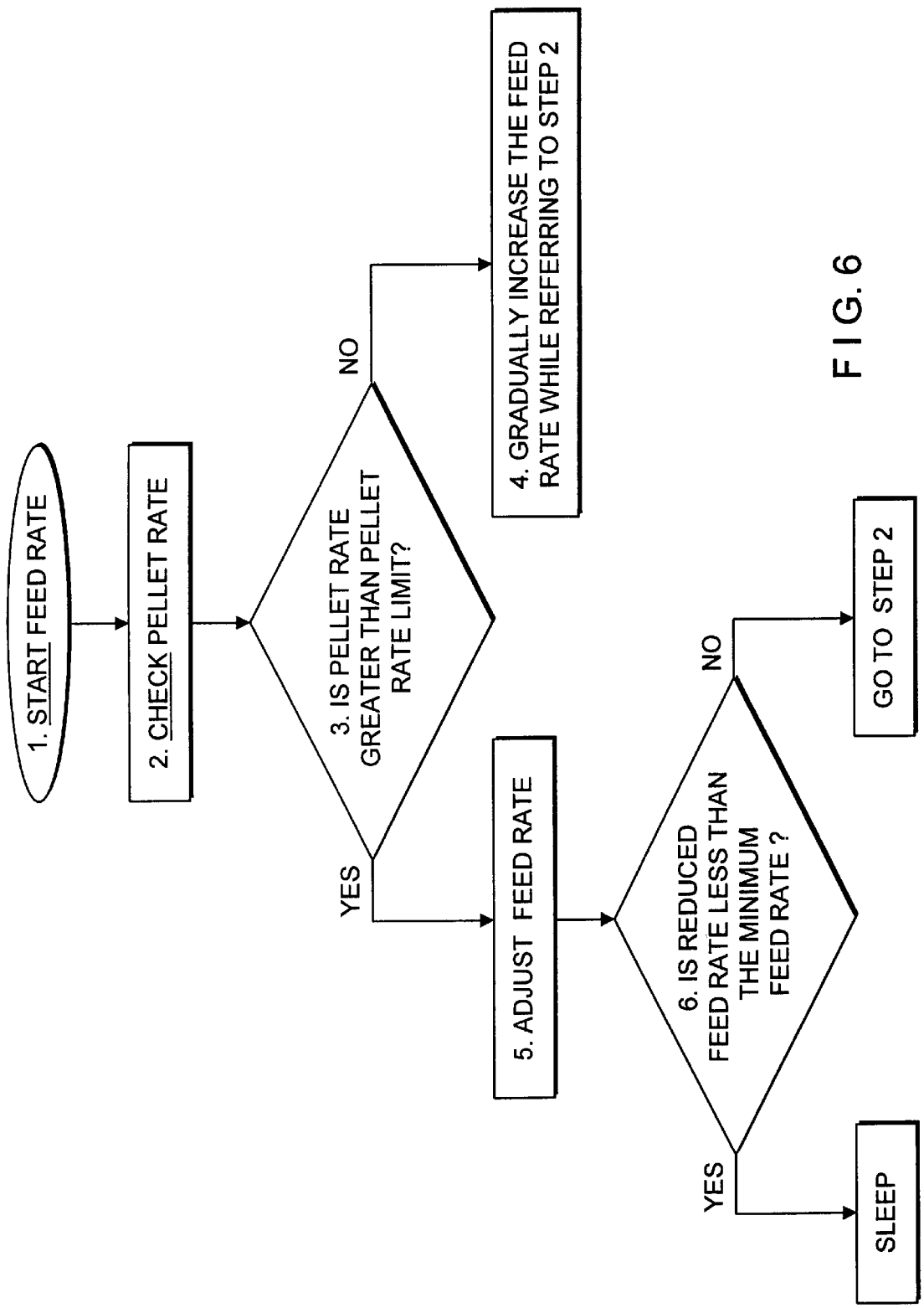
FIG. 6 represents a flow diagram of a typical feeding regime.

FIG. 6 illustrates a typical feeding process, monitored by the computer data storage media. It assumes a spatial feed distribution, and that the pellet density remains reasonably constant. Water current information is programmed into the system and considered when distributing the feed The sensor is also positioned so as to take the largest possible sample of uneaten pellets Finally it is to be understood that various alterations, modifications or additions may be introduced into the system of the present invention previously described without departing from the spirit or ambit of the invention.

We claim:

1. A feeding method for cultured species including:
   (a) providing
      i) a sensor able to detect feed particles passing through a sample area; and
      ii) a control unit, including computer data storage media in communication with the sensor; and
   (b) detecting and discriminating feed particles that pass through the sample area;
   wherein the control unit is able to process information obtained from the sensor and regulate subsequent feed output based on algorithm parameters, said algorithm parameters determine the instantaneous feed rate of the cultured species to adjust and match the preferred feed values meted to the cultured species at any given time.

2. A feeding method according to claim 1 wherein the sensor is able to discriminate between feed particles from other matter that may pass through the sample area.

3. A feeding method according to claim 1 wherein the control unit is able to store the feeding history of the cultured species and calculate an optimum feed regime based on the stored history, and optionally other inputed parameters.

4. A feeding method according to claim 1 wherein the control unit is able to regulate the feed output meted to the cultured species.

5. A feeding method according to claim 4 wherein the feed output is regulated by at least the following steps:
   (a) dispensing the minimum feed value to the cultured species;
   (b) determining the amount of feed particles passing through the sample area;
   (c) evaluating the number of feed particles in the sample area relative to a predetermined value and adjust subsequent output accordingly by:
      (i) increasing the feed output if the number of feed particles is below a predetermined value;
      (ii) maintaining the feed output if the number of feed particles are within a predetermined threshold;
      (iii) decrease the feed output if the number of feed particles are above a predetermined value or discontinue feeding if the number of feed particles are above a predetermined minimum value.

6. A feeding method according to claim 5 wherein the feed is dispensed from a feed dispenser, operated for a period of from half a second to 60 seconds, with interval between feeds ranging from 1 second to 5 minutes.

7. A feeding method according to claim 4 including the further steps of:
   (a) prior to dispensing the minimum feed value, establishing the relevant information relating to the setting of algorithm parameters;
   (b) calibrating the sensor to determine spatial configuration relating to the sample area; and
   (c) following the dispensing of a feed value, comparing and adjusting the calibration of the sensor to compensate for uncalibrated objects.

8. A fish feeding method according to claim 1 wherein the sensor is any sensor capable of measuring the change in flux of particles passing through a sample area, including measurement by optical, ultrasonic or other doppler effect.

9. A fish feeding method according to claim 1 wherein the sensor includes:
   (i) a body having an aperture orientated in use to allow objects to pass therethrough;
   (ii) at least one light emitter for projecting a band of light across the aperture;
   (iii) at least one light receiver for detecting the amount of light passing across the aperture;
wherein in use, the profile of an object passing through the aperture is determined ratiometrically by measuring the instantaneous change in light level caused by the occlusion of light by the object.

10. A feeding method according to claim 9 wherein the sensor further includes collimating mirrors to direct the light from the light emitter to the light receiver.

11. A feeding method according to claim 9 wherein real-time analysis of the profile of the object passing through the aperture allows for discrimination between feed particles and other objects passing through the aperture and to determine the rate of which the feed particles pass through the aperture.

* * * * *